(12) United States Patent
Kozee et al.

(10) Patent No.: US 9,662,920 B2
(45) Date of Patent: *May 30, 2017

(54) METHOD OF PRINTING SECURITY CODE

(71) Applicant: VIDEOJET TECHNOLOGIES INC., Wood Dale, IL (US)

(72) Inventors: Michael Kozee, Wheaton, IL (US); Jeffrey Pierce, Aurora, IL (US); Michael Sullivan, Belvidere, IL (US); Linfang Zhu, Woodridge, IL (US)

(73) Assignee: Videojet Technologies Inc., Wood Dale, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/971,267

(22) Filed: Dec. 16, 2015

(65) Prior Publication Data

US 2016/0101639 A1    Apr. 14, 2016

Related U.S. Application Data

(63) Continuation of application No. 14/371,835, filed as application No. PCT/US2013/023237 on Jan. 25, 2013, now Pat. No. 9,243,157.

(60) Provisional application No. 61/591,666, filed on Jan. 27, 2012.

(51) Int. Cl.
*B41M 3/14* (2006.01)
*B41M 5/00* (2006.01)
*C09D 11/328* (2014.01)
*C09D 11/50* (2014.01)
*B41J 2/01* (2006.01)
*C09D 133/08* (2006.01)
*C09K 11/06* (2006.01)

(52) U.S. Cl.
CPC ............... *B41M 3/144* (2013.01); *B41J 2/01* (2013.01); *B41M 5/0023* (2013.01); *C09D 11/328* (2013.01); *C09D 11/50* (2013.01); *C09D 133/08* (2013.01); *C09K 11/06* (2013.01)

(58) Field of Classification Search
CPC ... B41M 3/144; B41M 5/0023; C09D 11/328; C09D 133/08; C09D 11/50; C09K 11/06; B41J 2/01
See application file for complete search history.

(56) References Cited

U.S. PATENT DOCUMENTS

| | | | | |
|---|---|---|---|---|
| 9,243,157 B2* | 1/2016 | Kozee | ............... | B41M 3/144 |
| 2006/0160917 A1* | 7/2006 | Oyanagi | ............ | C09D 11/101 |
| | | | | 522/7 |
| 2008/0179562 A1* | 7/2008 | Quincy | ............. | A61F 13/8405 |
| | | | | 252/8.91 |
| 2008/0252066 A1* | 10/2008 | Rapoport | .............. | B41M 1/14 |
| | | | | 283/94 |
| 2010/0214373 A1* | 8/2010 | Carr | .............. | B41M 3/142 |
| | | | | 347/73 |
| 2011/0293899 A1* | 12/2011 | Tiller | .............. | C09B 3/20 |
| | | | | 428/195.1 |

(Continued)

*Primary Examiner* — Alessandro Amari
*Assistant Examiner* — Yaovi M Ameh
(74) *Attorney, Agent, or Firm* — Robert L. Wolter; Beusse, Wolter, Sanks & Maire PLLC

(57) ABSTRACT

A method of printing a security code on an article includes applying droplets of an ink composition with an ink jet printer to a surface of an article to print an encrypted code. The ink composition includes an organic solvent, a binder resin, and a luminescent dye.

14 Claims, 2 Drawing Sheets

(56) References Cited

U.S. PATENT DOCUMENTS

2012/0196966 A1* 8/2012 Ozawa ................. C09D 11/322
                                                                      524/377

* cited by examiner

METHOD OF PRINTING SECURITY CODE

BACKGROUND OF THE INVENTION

The present disclosure relates to the use of ink containing luminescent dyes for machine readability and/or security applications.

There is a need for many products to include a machine readable code or mark. Existing online printing systems are either too costly to implement or are too unreliable due to several key aspects. First, the machine readable or security code is applied at high speed directly onto, for example, mail envelopes or the packaging material of consumer goods and then needs to be subsequently read with high precision and repeatability to be verified online by the system. Camera-based reading systems are often employed in the verification of such codes because they are relatively inexpensive and can be easily adapted to read various code symbologies. As the case with any digitally interpreted image, cameras require a certain dwell time (or acquisition time) over the printed code when attempting to acquire the digital image that is used to decipher and analyze the code therein. The printing background may be highly variable (e.g., including multiple colors) with both light and dark regions. The dark and light regions interfere with what would otherwise be a coherent light pattern emitted from the surface. For example, the light regions artificially amplify the light that the camera sees and, conversely, light is attenuated by the dark regions. For these reasons, it is often difficult, especially at high speed, for an automated system to decipher these codes.

Printed codes from luminescent inks are illuminated by an excitation light source with a given wavelength range and spontaneously emit light at a second wavelength range. The fact that light is actively emitted from the surface and travels directly back to the camera allows for a greater imaging contrast between the printed code and the background as when compared with, for example, a merely light absorbing mark, especially at rapid acquisition rates. For example on a high speed production line (i.e., up to about 1000 feet per minute) an item may spend a small amount of time within a camera's field of focus. There is generally a need for bright luminescent inks that solve these high speed machine readable applications.

For machine readable applications and particularly security applications, there is often a need for the print codes to be durable and to survive environmental conditions for a predetermined life-span after printing. Fluorescent or phosphorescent pigmented inks are often selected for these applications based on their insolubility, water and lightfastness.

There are downsides with to using luminescent pigments instead of dyes for machine readable applications. For example, fluorescent pigments generally exhibit reduced fluorescence as compared to fluorescent dyes. Reduced fluorescent intensity reduces the reader's ability to verify the printed code on a high speed production line. Current approaches that rely on pigments are also less reliable due to problems associated with running pigmented inks reliably in inkjet printers. The inks and systems of this invention lend toward better system uptime, good print quality, verifiability at high speed with camera systems, good water resistance and relatively good light stability.

The needs as outlined above apply to several specific applications including black market security applications, grey market or diversion prevention, producer authentication, postal tracking, transactional printing, and other applications. For all of these applications, it is commonly required that the system exhibit system reliability, good code readability and durability.

BRIEF SUMMARY OF THE INVENTION

The present disclosure relates to the use of ink containing luminescent dyes for security applications.

In one aspect, method of printing a security code on an article includes applying droplets of an ink composition with an ink jet printer to a surface of an article to print an encrypted code. The ink composition includes an organic solvent, a binder resin, and a luminescent dye.

In another aspect, an ink jet ink composition includes an organic solvent; a solubilising agent selected from cyclic ketones, heterocyclic amides, cyclic alcohols, and furans; a binder resin; and a luminescent dye.

DETAILED DESCRIPTION OF THE INVENTION

Figure 1:
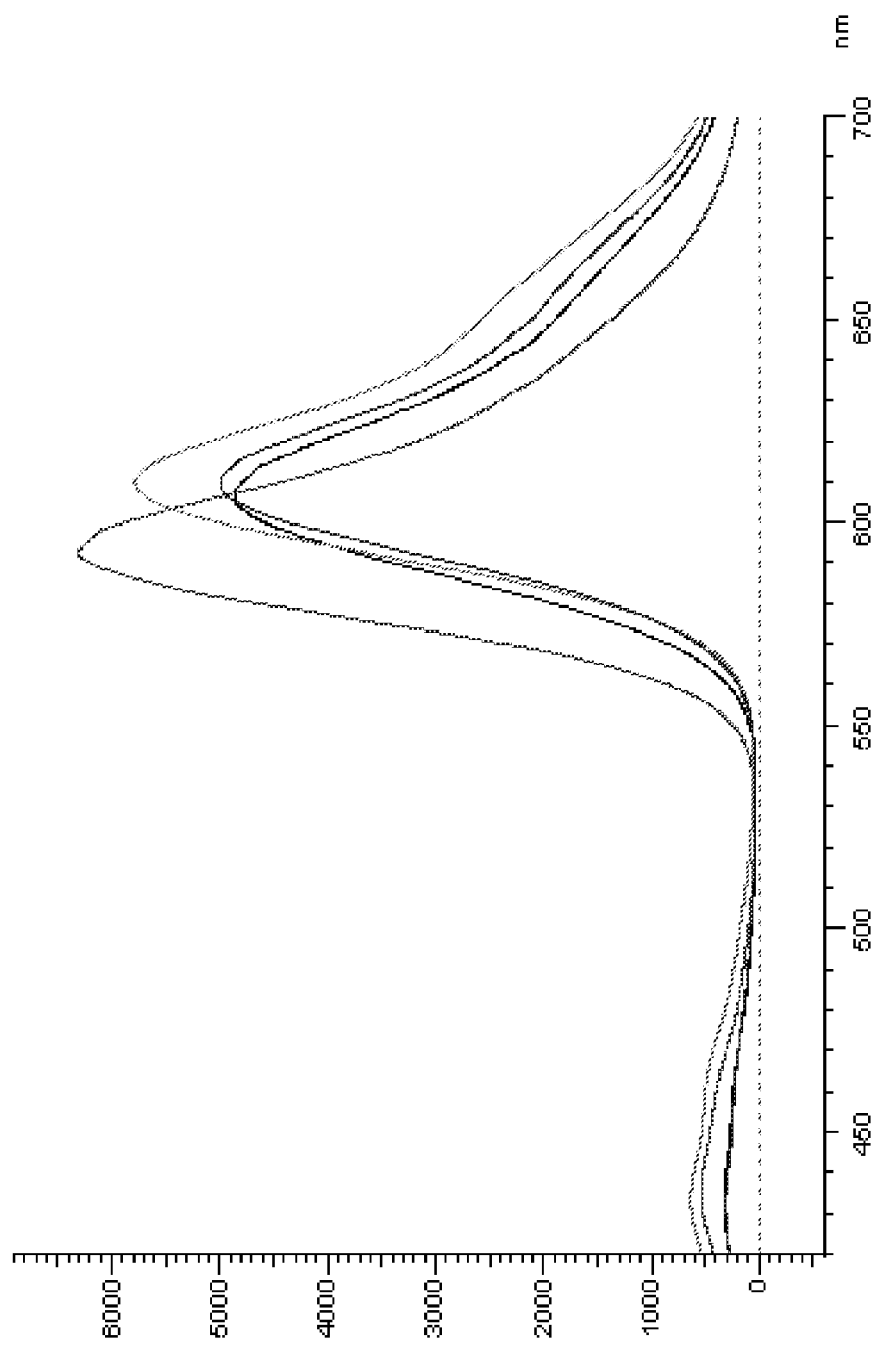
FIG. 1 is a graph showing the initial solid state fluorescence of Examples 1 and 2.

The disclosure relates to a process for printing and authenticating a security feature directly onto a good on a production line using a continuous inkjet printer. The method includes providing a printer, printing onto the good using an ink with a prescribed formulation, optionally verifying the printed code immediately after printing, and subsequently verifying the printed code after printing. The disclosed inks are visibly luminescent using excitation light in the UV or visible ranges. The printed code may be visible or invisible to the naked eye, but are readable by a machine vision system. The printed codes may be alphanumeric codes or barcode symbologies such as a linear or two dimensional barcodes. The data contained therein may be encrypted and therefore may require special software to read and verify. The security of the printed code is achieved through the combination of the high readability of the fluorescent ink, the encryption of the data, and the use of a special reader that both reads the fluorescent mark and decodes the data. The printed codes can predictably last on products over the typical lifetime of the product, for example, for one year or longer. The CU printer and prescribed inks will not cause undue production downtime for customers using the system.

In one embodiment, the printed marks provide a way for agencies to control whether or not a tax has been assessed. For example, only goods that are marked by the methods described herein (thereby confirming that they meet taxation standards) would be authorized to be distributed through a wholesale or retail network. A system as prescribed herein is especially important for high values items like tobacco and alcohol based products for which relatively high levels of taxes are levied. It is very important that the system be easy to adopt for various producers. Government mandated implementation of a system that reduces production efficiency would be very difficult to justify, sustain and ultimately enforce. Hence, a printing and authentication system with high uptime and ease of integration is desired. Beverage production line speeds can be several hundred feet per minute (FPM) up to about 1200 FPM on beer cans. The inks disclosed herein are dye based which provide advantages over pigmented inks with respect to system uptime reliability and ease of maintenance. Good print quality that is important for reliable code verification is reliably maintained at these line speeds. The marks may be applied to any part of the packaging, are relatively water and lightfast, and have good adhesion on the packaging. The marks are preferably at least partly visible over the substrate's background so that the government agency and distributors/retailers can see the mark without always having to use the special reader.

The printing and verification method occurs with minimal invasiveness to existing production processes. A specific example of the kind of product that would benefit by the current invention would be mass produced beverages, such as beer. In most beer breweries, date and lot codes are applied via some method of digital printing. Typically beer bottles are filled with refrigerated beer (cold filled) and then subsequently digitally printed. Embodiments of the security marks disclosed herein are intended to be applied on the same production line that this printing occurs, e.g., after the cold filling process. The marks thus produced must be generally resistant to water and condensation, to which these consumer products are routinely exposed during and after this process.

The mark may be applied to any surface of the product, top, side or underside. A particularly suitable substrate on bottles onto which to apply the mark is the bottle cap. Caps are flat and present a consistent focal plane for the reading system. Hence, a preferred process comprises security marking after the bottles are filled and the caps are affixed. An alternative preferred cap printing process would be to mark the caps just prior to the point when they are affixed. An example of a different print location would be the underside of a bottle or can, which also can be a relatively flat surface (for example, at the center of the bottom of the can).

A suitable printer for printing the ink compositions described herein is a single nozzle continuous inkjet (CIJ) printer. CIJ printers can deliver printed marks at production line speeds and can be flexibly arranged on a production line due to their compact overall size. A particularly suitable printer is a Videojet 1000 Series CIJ printer such as the Videojet 1610 which has a number of known system advantages such as high printer uptime, good print quality, and ease of maintenance.

Uptime in CIJ printers is generally limited by both short term and long term maintenance requirements. Ink will slowly accumulate within the print head due to, for example, the presence of unmerged satellites, micro-satellites, or a partly restricted nozzle orifice that can lead to jet skewing. The print head must be cleaned routinely with a cleaner by a production line operator. The rate of ink buildup can be particularly bad if the ink stream becomes skewed due to impurities in the ink or if components with low solubility get trapped in the nozzle during operation. The average period between routine print head cleanings is expected to be on the order of days or weeks. Besides these routine cleanings, the ink systems used to recirculate the ink within the printer will need to be repaired or replaced after a certain operational period. The dye based inks described here would enable users to have both reduced downtime as a result of fewer routine print head cleanings and reduced frequency of replacing ink system components within the printer.

The marks may be applied at any reasonable production line speed, i.e., less than 1200 FPM. In the bottling line example, marks may be applied at line speeds around 500 FPM. The mark may be visible or invisible to the unaided eye.

The inks preferably fluoresce in the visible range using excitation light either in the UV or visible ranges. It is generally preferred that marking and reading occur very close in time (or location) on the production line. The overall security system can require that each printed mark is positively verified online. A potential scheme that would be used to accomplish this would be to assign each printed product a number (i.e., serialized, random or encrypted) that is embedded into the printed security mark. These numbers may be generated by the printer or be fed to the printer via a network connection by, for example, a centralized database. An online vision system is used for verification of each code that is printed. The verifier is fed the series of codes that are printed and then attempts to match these with the actual printed codes that it deciphers. As long as all of the deciphered codes match the sequence in the database, then the system continues production. If a code is unreadable or missing, the system can be stopped to be checked and/or repaired. In this manner, insurance is provided that each product is successfully marked.

Alternatively, only parts of the printed marks may be authenticated to ensure that the mark has been printed, but not necessarily to extract all or even some of the data in barcode. For example, to ensure that the printed mark is present, a reader may only need to determine that a compound with a specific fluorescence emission profile is present. A reader may look for an emission at a specified wavelength window where emission would not normally occur without the intended security mark or where any light reflections would be attenuated to a suitable degree not to cause a false-positive. To assist in reading, the light source may be filtered to only emit at discrete wavelengths or the reader may be configured with filters to block unwanted reflected or incident light.

The marks may be alphanumeric or symbolical such as a linear or two dimensional barcode. The data contained therein may be easily encrypted by any means of encryption. Encryption is typically used to ensure that counterfeiters can not reproduce marks that contain the correct information (e.g., a code that corresponds to a given product type or manufacturing origin), as the intent with any encryption scheme is to render the encryption pattern indecipherable to third parties.

The system may comprise any reading system capable of capturing the printed image. For example a camera employing an imaging detector based on a charged coupled device (CCD) or a complementary metal-oxide-semiconductor (CMOS) may be employed. A specific non-limiting example is a Cognex Legend camera. The illumination light source can be any suitable source but is typically one with an energy range between about 200 and 450 nm. The particular source may be selected based on the absorption wavelength of the fluorescent dyes or the required fluorescence emission, workplace, safety, or system cost. Preferred light sources are fluorescent mercury containing lamps or xenon flash lamps with relatively high output near either 250 or 360 nm wavelengths, although these discrete wavelengths should not be viewed as limiting. Other preferred sources would include lamps employing light emitting diodes with a center, discrete wavelength between about 350 and 460 nm. To read at high speeds, image acquisition of the security mark for each marked product may need to occur on the order of 10 milliseconds or less, or preferably 1 millisecond or less.

The CIJ ink formulation for printing the security mark generally contains one or more luminescent compounds (or dyes), a resin, a conductive agent and a carrier solvent or solvent mixture. The ink formulation may further contain one or more co-resins and other additives such as surfactants, plasticizers, or solubilizing agents.

Suitable carrier solvents are fast-drying organic solvents. Particularly suitable ones are ketones and alcohols with evaporation rate ratios relative to n-butyl acetate of greater than 1.0. The ink composition may include the carrier solvent in a range of 60% to 90% by weight of the ink composition, preferably in the range of 70% to 80% by weight.

The luminescent compound or dye is any compound that is soluble in the carrier solvent to an extent that provides measurable fluorescence in solution and to an extent characterized by a weight formulation percentage that is greater than 0.01% Luminescent compounds may be fluorescent, phosphorescent, bioluminescent, or the like and are selected from the following general classes: aromatic (e.g., anthracene); substituted aromatic (e.g., nitrobenzene); heterocyclic (e.g., furan, thiophene); cyanine; phthalocyanine; naphthalocyanine; xanthene (e.g., fluorescein, rhodamine); acridine (e.g., euchrysine); phenazine (e.g., safranin); napthol; porphyrin; coumarin; pyrromethene; oxazine; oxazole (e.g., benzooxazole), perylene, napthalimide, triazine, imidazoline, di/triazole, stilbene (e.g., biphenystilbene) and any combination thereof. Applicable luminescent compounds are any that possess a luminescence emission peak wavelength between 400 and 750 nm.

In one embodiment, the ink composition includes one or more invisible fluorescent compounds with fluorescence in the violet, blue or green regions of the light spectrum. Particularly suitable kinds of invisible fluorescent compounds are optical brightener including oil soluble varieties such as benzoxazoles. One specific example is 2,2'-(2,5-Thiophenediyebis[5-tert-butylbenzoxazole] with a CAS number of 7128-64-5, sold under the trade name such as Uvitex OB, and Tinopal OB. This compound is often used as a tracer compound in oily media (such as fuels, pesicides, etc.) as it is hydrophobic and possesses good solubility in selected polar organic solvents like MEK.

A particularly suitable xanthene fluorescent dye used as a luminescent compound conforms to the structure for C.I. Index Basic Red 11:1 and is sold under the trade name Basonyl Red 560. Another suitable dye example is C.I Index Solvent Red 49. Other preferred luminescent compounds are fluorescent naphthalimide and perylene dyes sold under the trade name Lumogen from BASF Corporation. One particularly suitable example is Perylene F Red 300 (or 305). Other examples of preferred Perylene dyes are trade named Lumogen F Yellow 083, Lumogen F Yellow 170, Lumogen F Orange 240, Lumogen F Pink 285, Lumogen F Violet 570, and Lumogen F Blue 650.

General structures of suitable perylene luminescent compounds are shown in the formulas below and are perylene diimides (Formula A) or perylene dianhydrides (Formula B) where $R^1$ and $R^2$ on the perylene rings and imide nitrogen, respectively, are hydrogen or alternatively, any conceivable substituents including those -alkyl, -aryl, -benzyl, -alkoxy or phenoxy types as shown (provided only as examples). More examples of this luminescent compounds include but are not limited to the following formulations (or CAS#'s): 1,6,7,12-tetrachloroperylene tetracarboxylic acid dianhydride (CAS 156028-26-1); 1,6,7,12-tetra-t-butylphenoxy-N—N'-dioctyl-perylene-3,4,9,10-tetracarboxylic dianhydride (CAS 872005-48-6); 1,6,7,12-tetra-t-butylphenoxy-N—N'-bis(octadecyl)-perylene-3,4,9,10-tetracarboxylic dianhydride (CAS 545387-15-3); 1,6,7,12-tetra(morpholinyl)-N,N'-bis (octadecyl)-3,4,9,10-perylene dicarbonyl amide; 1,6,7,12-tetrachloro-N—N'-bis(octadecyl)-perylene-3,4,9.10-tetracarboxylic acid diimide (CAS 97097-95-5); 1,6,7,12-tetra-t-butylphenoxy-N—N-dioctyl-perylene-3,4,9,10-tetracarboxylic diimide (CAS 112100-07-9); 1,6,7,12-tetrachloro-N—N'-dioctyl-perylene-3.4.9.10-tetracarboxylic acid diimide (CAS 95689-65-5); 1,6,7,12-tetra-t-butylphenoxy-N—N'-bis(octadecyl)-perylene-3,4,9,10-tetracarboxylic dianhydride (CAS 112100-07-9); N,N'-Bis(2,6-diisopropylphenyl)-1,6,7,12-tetraphenoxyperylene-3,4:9,10-tetracarboxdiimide; Anthra[2,1,9-def:6,5,10-d'e'f'] diisoquinoline-1,3,8,10(2H,9H)-tetrone, 2,9-bis[2,6-bis(1-methylethyl)phenyl]-5,6,12,13-tetraphenoxy; CAS 112100-07-9; and, N,N'-Bis(2,6-diisopropylphenyl)-3,4,9,10-perylenetetracarboxylic diimide (CAS 82953-57-9).

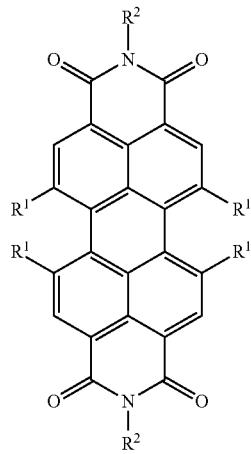

A

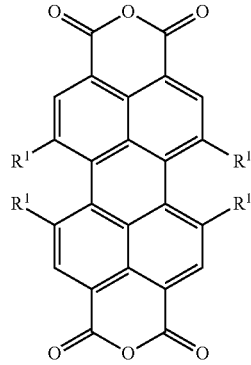

B

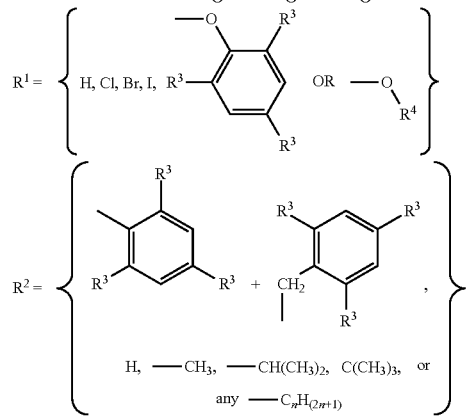

-continued $R^3$ or $R^4$ = H, —CH$_3$, —CH(CH$_3$)$_2$, C(CH$_3$)$_3$, or any —C$_n$H$_{(2n+1)}$ Typically suitable luminescent compounds are fluorescent dyes with quantum yields in a given solvent with respect to a quantum yields of standard dyes equal to or better than 0.6. In general, the dyes specified above exhibit quantum yields much greater than 0.5.

In preferred embodiments, a combination of two or more luminescent compounds is used with different luminescence emission profiles. For example, the fluorescence peak emission of Species 1 will be a first wavelength and the peak emission of Species 2 will be at a second wavelength, wherein the first and second wavelengths are separated by at least 50 nm. It is also preferred that the peak emission wavelength of Species 1 is within 150 nm of the peak absorption wavelength of Species 2.

Any combination of two or more of the luminescent compounds disclosed hereon may be used. In addition, non-luminescent colorants such as titanium dioxide and colored or black solvent dyes such as C.I. Solvent Black 29 can be added to the ink to impart additional visibility to the naked eye.

The printed mark is preferably water resistant when printed on porous materials like paper and also nonporous materials like plastics or metals. By water resistant is meant that within 1 minute after printing the mark, it will resist removal from marked surface. For example, a mark printed on a bottle cap, glass or aluminum, when submerged directly in water 1 minute after printing, will exhibit no measurable loss in fluorescence intensity after a period of 1 hour, based on the measured fluorescence intensity of the dried mark at one minute Such a printed marked will also resist loss of intensity even if rubbed by a finger.

The printed code is also preferably lightfast when printed on non-porous substrates. Lightfastness is defined based on performance in test equipment meant to simulate either indoor or outdoor light exposure. A typical simulated outdoor lightfastness test is conducted in an air cooled Xenon fadometer. The methods and apparatus generally conform to those which are generally described in ASTM Methods G151 and G154. In a typical outdoor simulation, the printed samples are exposed in the Xenon fadometer for a minimum continuous period of 48 hours at the following test conditions: 0.28 W/(m$^2$-nm) irradiance at 340 nm; 40° C. black panel temperature, and 40% Relative Humidity. The irradiance intensity should be benchmarked against accepted Blue Wool Scale reference samples as described for example in ISO 105 B02. After exposure to a given radiation dosage, the color changes of Blue Wool samples can be assessed using CIELAB ΔE measures. A ΔE color change lower than about 4 indicates that a given exposed Blue Wool standard is not overly faded. In other words, by finding samples that exhibit a ΔE lower than 4 at 48 hours of exposure at the above described conditions, the relative Blue Wool rating for this exposure level can be established. If the fluorescent samples are still readable at this interval, they are said to be comparable to the Blue Wool standards (i.e., the one with the lowest BWS rating and also a ΔE<4). After such a test on non-porous substrates (i.e., epoxy coated bottle caps and aluminum), the security marks described herein are still readable using the systems and methods described herein. They also exhibit Blue Wool Scale ratings (as defined here) of at least 3, or more preferably at least 4. This is very good performance for a dye based ink and is comparable to fluorescent pigmented inks that typically exhibit much lower initial fluorescence intensities. The marks may also be readable at after periods that yield even higher net exposure energies than those defined above.

It is often the case that fluorescent compounds, particularly ones with high lightfastness, exhibit limited solubility in the preferred solvents due in part to their molecular structure. Limited solubility of ink components may result in reduced uptime even for a dye based CIJ inkjet printer as described above. For example, a compound with low solubility may precipitate within or near the nozzle due to drying of solvent around the nozzle orifice. Further, as drops are generated by the system, the ink that is recirculated within the system is concentrated by evaporation further reducing solubility. Poor solubilization within the ink is further aggravated atlow ambient temperatures though it is expected that industrial inkjet printing systems must still operate reliably.

For consistent operation, a compound should be fully soluble in the ink formulation. Solubilising agents may be added in levels up to about 40% to provide sufficient solubility. Solubilising agents are defined as solvents that are slower drying than the volatile solvents that provides the main ink solvent, and also show as good or better bulk solubilization of the luminescent compounds in terms of mass percentage of the luminescent compound that is soluble in the agent between about 20 and 25° C. Suitable solubilising agents are cyclic ketones including cyclohexanone; heterocyclic amides including alkylated pyrrolidones (i.e., n-methyl pyrrolidone, n-ethyl-pyrrolidone, 2-pyrrolidone, octylpyrrolidone); cyclic alcohols including benzyl alcohol, and furans. Solubilising agents may be aromatic or aliphatic.

The ink further includes binding agents, preferably water insoluble ones. A binding agent may be defined as a resin with a softening point greater than 45° C. Suitable binders are any thermoplastic resins that are soluble in the main carrier solvents. In an embodiment, the ink composition includes one or more resins selected from acrylic resins, vinyl chloride/vinyl acetate copolymers, polyesters; polyvinyl butyral resins, ethyl cellulose resins, polyurethane resins, modified rosin resins, phenolic resins, polyamide resins, cellulose ester resins, cellulose nitrate resins, polymaleic anhydride resins, acetal polymers, styrene acrylic copolymers, aldehyde resins, copolymers of styrene and allyl alcohols, epoxies, polyhydroxystyrenes and polyketone resins, and any combination thereof. Particularly suitable binders are selected from the classes of acrylics, polyesters, polyketones, silicones (polysiloxane), and cellulose esters.

Specific preferred acrylic polymers may be co- or terpolymers derived from one or more alkyl-type monomers (such as a methyl methacrylate, n-butly methacrylate, etc.) and a functionalized monomer such as acrylic acid or methacrylic acid. Examples of suitable resins are those from Dow Chemical Corporation sold under the trade-name Acryloid or Paraloid or Dianal resins from Dianal Corporation. A specific example of a non-functionalized resin is sold under the trade name Paraloid B-60 which is a methyl methacrylate and butyl methacrylate copolymer with a molecular weight of approximately 50,000 Daltons. Other acrylic polymers are potentially suitable such as ones Paraloids B-99n and B-66, which are both copolymers of methyl methacrylate and butyl methacrylate and may comprise small amounts of methacrylic acid. Still more examples that are potentially suitable are available from Lucite Corporation under the trade name Elvacite, such as Elvacite 2042, an ethyl methacrylate derivative.

Any suitable cellulosic resin can be employed, for example, a cellulose ester or an alkylcellulose. Cellulose ester is cellulose some or all of whose hydroxyl groups have been modified to have an ester function or mixed ester functions, e.g., by one or more ester groups wherein the ester group has 2-8 carbon atoms, preferably 2-5 carbon atoms. Examples of cellulose ester include cellulose mixed esters such as acetate butyrate and cellulose acetate propionate. An example of a suitable cellulose ester is cellulose acetate butyrate available commercially as CAB 551-0.01 from Eastman Chemical, Kingsport, Tenn. The alkylcellulose is cellulose some or all of whose hydroxyl groups have been modified to contain an alkyl group of 1-8 carbon atoms, preferably 2-4 carbon atoms, e.g., ethylcellulose. Nitrocellulose can also be employed as a cellulosic resin. A preferred silicone resin includes a polysiloxane backbone with any practical combination of substituents on the silicone atoms such as 100% phenyl, 100% methyl blend of the two in any proportion. An example of a mixed phenyl/methyl siloxane that is preferred is sold with the trade name DC-233 from Dow Corning.

Preferred polysters are of the synthetic saturated variety for example as the result of a copolymerization of a diacid and a dialcohol. Specific preferred examples of such polyesters with good ketone solubility are available from Evonik Industries under the trade name Add Bond LTH or from Bayer Corporation under the trade name Desmophen 5-105-10.

The exemplary resins above are each characterized by low molecular weights less than about 120,000 Daltons and very low acid numbers less than about 60.

More than one water insoluble binder may be employed. If multiple kinds of binders are used, the preferred percentage of water insoluble binder resin with respect to cumulative binder content is at least 60% and more preferably greater than 90%. The cumulative binder concentration in the formulation is preferably no less than 5%, more preferably no less than 10% and most preferably no less than 15%.

The ink composition preferably has a low solution resistivity, such as within the range of about 20 to about 2000 ohm-cm. The desired resistivity can be achieved by the addition of an ionizable material or conductive agent which acts as a charge carrier in the liquid ink. Examples of such conductive agents include ammonium, alkali, and alkaline earth metal salts such as lithium nitrate, lithium thiocyanate, lithium trifluoromethanesulfonate, potassium bromide, and the like; amine salts such as dimethylamine hydrochloride, and hydroxylamine hydrochloride; tetraalkylammonium salts such as tetrabutylammonium bromide, tetrabutylammonium hexafluorophosphate, tetrabutylammonium thiocyanate, tetrapropylammonium bromide, tetrapropylammonium acetate, tetraphenylphosphonium bromide as well as ammonium acetate. Preferred conductive agents include lithium triflate, tetrabutylammonium hexafluorophosphate, tetrabutylammonium nitrate, tetrabutylammonium thiocyanate and tetrapropylammonium acetate. Any suitable amount of the conductive agents can be used. Normally, a conductive agent content of up to about 3% by weight of the ink composition provides the desired conductivity, typically in a range of about 0.5% to about 2%. In certain desired ink compositions, high solution conductivity is not necessary, and the conductive agent may be omitted.

The ink composition may further include one or more additives such as plasticizers, surfactants, adhesion promoters, and mixtures thereof. Plasticizers may be polymeric and may be added in addition to a binder resin present, generally exhibiting molecular weights that are less than 5,000. Examples of suitable plasticizers include phthalate plasticizers, e.g., alkyl benzyl phthalates, butyl benzyl phthalate, dioctyl phthalate, diisobutyl phthalate, dicyclohexyl phthalate, diethyl phthalate, dimethyl isophthalate, dibutyl phthalate, and dimethyl phthalate, esters such as di-(2-ethylhexy)-adipate, diisobutyl adipate, glycerol tribenzoate, sucrose benzoate, dibutyl sebacate, dibutyl maleate, polypropylene glycol dibenzoate, neopentyl glycol dibenzoate, dibutyl sebacate, and tri-n-hexyltrimellitate, phosphates such as tricresyl phosphate, dibutyl phosphate, triethyl citrate, tributyl citrate, acetyl tri-n-butyl citrate, polyurethanes, acrylic polymers, lactates, oxidized oils such as epoxidized soybean oil, oxidized linseed oil, and sulfonamide plasticizers such as Plasticizer 8, available from Monsanto Co., St. Louis, Mo., which is n-ethyl o,p-toluene sulfonamide.

In certain embodiments, the plasticizer can be present in an amount from about 0 to about 5.0%, preferably from about 0.1 to about 2.5%, and more preferably from about 0.25 to about 1.0% by weight of the ink composition.

Examples of surfactants include siloxanes, silicones, silanols, polyoxyalkyleneamines, propoxylated (poly(oxypropylene)) diamines, alkyl ether amines, nonyl phenol ethoxylates, ethoxylated fatty amines, quaternized copolymers of vinylpyrrolidone and dimethyl aminoethyl methacrylate, alkoxylated ethylenediamines, polyethylene oxides, polyoxyalkylene polyalkylene polyamines amines, polyoxyalkylene polyalkylene polyimines, alkyl phosphate ethoxylate mixtures, polyoxyalkylene derivatives of propylene glycol, and polyoxyethylated fatty alcohols, fluorinated surfactants. Examples of a suitable polymeric silicone based surfactant are sold under the trade name Silwet. Examples of fluorinated surfactants include those sold under the trade name Zonyl from Dupont Corporation.

In any of the embodiments, the surfactant additive may be present in an amount from about 0.001 to about 2.0% by weight, preferably from about 0.005 to about 0.5% by weight of the ink composition.

The ink composition may have any suitable viscosity or surface tension. In embodiments the ink composition has a viscosity in the range of 1 cP to 10 cP, preferably in the range of 2 cP to 7 cP at 25° C. The ink composition preferably has a viscosity of between 2.5 and 5.0 at 25° C. The ink composition preferably has a surface tension from about 20 to about 35 mN/m at 25° C.

The ink composition can be prepared by any suitable method. For example, the chosen ingredients can be combined and mixed with adequate stirring and the resulting fluid filtered to remove any undissolved impurities.

EXAMPLES

Examples 1 to 3

An example of the limited solubility of a preferred luminescent compound is shown. MEK is a preferred solvent for CIJ ink compositions because of its wetting and drying characteristics as well as good solvency for preferred binder resins and conductive agents. However, the solubility of a preferred optical brightener, Tinopal OB, is limited in 100% MEK. Several different solvents were tested by added a specific weight percentage of Tinopal OB to a given solvent or solvent blend. The data in Table 1 illustrate that by combining selected solubilizing agents with MEK, the solubility of Tinopal OB in the blend is increased.

TABLE 1

| SOLVENT | Weight percentage of Tinopal OB | | | |
|---|---|---|---|---|
|  | 1% | 2% | 3% | 5% |
| MEK | ✓ | X | X | X |
| cyclohexanone | ✓ | ✓ | ✓ | X |
| benzyl Alcohol | ✓ | ✓ | X | X |
| n-Methyl pyrrolidone | ✓ | ✓ | ✓ | X |
| 50:50 Cyclohexanone:MEK | ✓ | ✓ | X | X |

✓ = full soluble, no solid visible; X = partly or insoluble (in actual or by inference).

In this case, blends particularly with cyclohexanone and MEK can result in increased solubility than with MEK alone. Formulations employing solubilizing agents are provided in the following examples.

TABLE 2

|  | Example 1 Weight percentage | Example 2 Weight percentage | Example 3 Weight percentage |
|---|---|---|---|
| MEK | 74.76 | 74.76 | 81.28 |
| Benzyl Alcohol | 2.81 | 2.81 |  |
| Ethanol, denatured |  |  | 4.00 |
| Cyclohexanone | 4.70 | 4.70 |  |
| Paraloid B-66 | 16.24 | 16.24 | 12.00 |
| FC-122 |  |  | 2.00 |
| TBAPF$_6$ | 0.77 | 0.77 |  |
| Tinopal OB | 0.50 | 0.50 | 0.50 |
| Basonyl Red 560 | 0.20 | 0.20 | 0.20 |
| Lumogen Red 305 |  | 0.50 |  |
| Silwet L-7622 | 0.02 | 0.02 | 0.02 |
| Total % | 100.00 | 100.50 | 100.00 |

MEK is methyl ethyl ketone available from Ashland Chemical Corporation. Cyclohexanone is available from DSM Chemical Corporation. Benzyl alcohol is available from Vesicol Chemical Corporation. Ethanol, denatured is a proprietary grade of denatured ethanol containing less than 10% denaturants. TBAPF$_6$ is tetrabutylammonium hexafluorophosphate available from Sigma Aldrich Corporation. Paraloid B-66 is a thermoplastic acrylic resin available from Dow Chemical Corporation. FC-122 is a lithium triflate available from Ozark Fluorine Specialties Corporation. Silwet L-7622 is available from Momentive Performance Material Corporation. Tinopal OB also known as Uvitex OB and Basonyl Red 560 are available from BASF Corporation. Lumogen Red 305 is a perylene based fluorescent dye also from BASF Corporation.

In these formulation examples, Tinopal OB serves to absorb the light energy from the excitation source between about 300 and 420 nm Without intending to be bound to theory, one potential mechanism is that the Tinopal OB fluoresces in the blue region between about 420 and 470 nm. The fluorescent light is then absorbed by the Basonyl Red 560 generating the excited state for that compound and subsequent orange/red fluorescence. The result is that the ink, when printed and excited with UV energy between about 250 and 450 nm, emits a very bright red/orange light, depicted in FIG. 1 as the emitted light spectrum, which can then be read using a CCD camera sensitive to visible light in that energy range. Alternatively, the printed mark may be excited by a visible light source. A UV light source is preferred as it provides better energetic separation between the excitation light source and the emitted light. This in turn improves the printed symbol's contrast levelas viewed by the camera because light filters may be employed that effectively attenuate the source, but that do no greatly attenuate the emitted light by the fluorophore.

As a demonstration, two dimensional data matrix barcodes were generated using a Videojet 1510 CIJ printer onto beer bottle caps. The caps were passed beneath the print head via a moving transport at approximately 200 FPM. Shortly after printing the data matrix codes were read with a camera based vision system (Cognex Legend camera) and an ultraviolet fluorescent illumination lamp. In this particular instance, a 590 mm bandpass filter (BP 590) was used affixed on a 25 mm lens. Nine different kinds of beer caps with highly variable colored pre-printed background graphic logos were printed and successfully read as is shown in the following Table 3. The data matrix codes were sufficiently visible to the camera irrespective of the color, darkness or variable nature of the pre-printed graphics.

TABLE 3

| CAP | BACKGROUND COLORS | CODE READ GRADE |
|---|---|---|
| Cap 1 | white/gray | A |
| Cap 2 | red/gold | A |
| Cap 3 | blue/white | A |
| Cap 4 | blue/white | A |
| Cap 5 | silver/gray | A |
| Cap 6 | black/gold | A |
| Cap 7 | black/gold | A |
| Cap 8 | white | A |
| Cap 9 | gray/white | A |

For each successful read, the camera-based image acquisition time was very short (under 5 milliseconds) which demonstrates that the fluorescent images described here yield sufficient brightness to be camera to be visible at high production line speeds up to about 1200 FPM. The acquisition time or shutter open time and code symbology would need to be adjusted accordingly for a given line speed.

Figure 2:
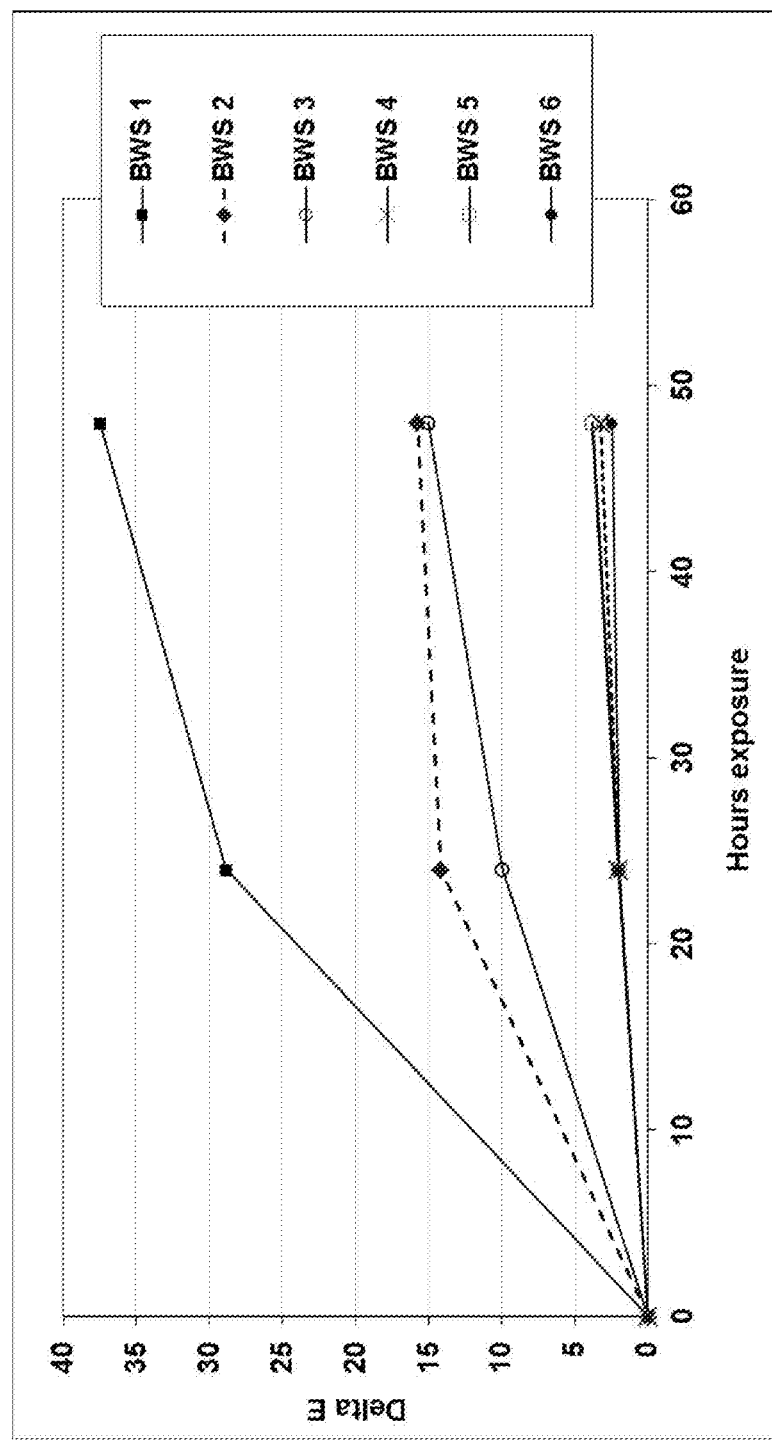
FIG. 2 is a graph showing the ΔE difference after fadometer exposure for various Blue Wool Scale reference standards.

The printed security marks are sufficiently lightfast to last on the caps (or other kinds of printed products) over the desired product lifetime. In this example, the products were expected to be stored up to one year in a warehouse or consumer store. Two dimensional barcodes were printed onto four different varieties of bottle caps using the ink of Example 1. The printed codes were exposed in a fadometer at an irradiance level of 0.28 W/(m$^2$-nm) (measured at the 340 nm reference point). All codes remained readable after 48 hours and after 72 hours of exposure time. Codes of Example inks 1 and 2 were further printed on aluminum and also assessed by the reader after 48 hours exposure under the same irradiance conditions. Very little or no loss in camera contrast or readability was observed for these samples. In addition, Blue Wool Scale fabric standards of different ratings were exposed under the same conditions. FIG. 2 depicts graphically the ΔE of the different standards at different exposure times. As can be seen, standards with a BWS rating of 3 are clearly faded under these conditions and those with a BWS rating of 4 or 5 are very close to exceeding the threshold of a ΔE of 4. The inks are still very readable at that time threshold. Hence, depending on the substrate, the printed inks exhibit lightfastness ratings equal to or better than textile standards with a BWS of 3.

The ink of Example 1 was operated in a Videojet 1510 printer for an extended period of time monitoring the code quality periodically. The ink provided generally very good print quality printing 2-D data matrix codes onto beer bottle caps. The ink was printed repeatedly into a receptacle for over 233 hours at 45° C. ambient temperature. During this period, the printer required three routine print head cleanings with a calculated average time of 77 hours between failures. Example 3 ink was similarly run in the same printer at the same conditions for 226 hours requiring four routine cleanings yielding a run average of 57 hours. In separate tests, the inks were also operated at low temperature (5° C.) where it was expected that the relatively poor solubility of the fluorescent brightener in the carrier solvent at low temperatures might negatively impact reliability. The ink of Example 1 employing solubilizing agents was operated for a period of more than 300 hours without failure or the need for a routine cleaning. In comparison, the ink of Example 3 was operated for only about 116 hours and yet requiring five routine cleanings with a resulting average run time of only 23 hours. The primary difference between the two formulations was that Example 1 employed the solubilizing agents benzyl alcohol and cyclohexanone while Example 2 employed none. Hence, it was deduced that solubilizing agents dramatically increase the average run time of the inks, particularly at low ambient temperatures.

Examples 4-7

Additional suitable formulations are provided in the following examples.

TABLE 4

|  | Example 4 Weight percentage | Example 5 Weight percentage | Example 6 Weight percentage | Example 7 Weight percentage |
| --- | --- | --- | --- | --- |
| MEK | 65.47 | 68.07 | 70.21 | 56.49 |
| Benzyl Alcohol | 2.50 | 2.40 | 2.30 |  |
| Ethanol, denatured | 4.70 | 4.60 | 4.33 | 4.70 |
| Cyclohexanone | 4.70 | 4.60 | 4.33 | 10.50 |
| Paraloid B-66 |  | 12.40 |  |  |
| Paraloid B-99 | 19.70 |  |  |  |
| CAB 551-0.01 |  |  | 10.14 |  |
| Add Bond LTH |  |  |  | 25.00 |
| DC233 |  | 5.50 | 6.45 |  |
| FC-122 | 2.10 | 1.60 | 1.47 | 2.60 |
| TBAPF$_6$ |  |  |  |  |
| Tinopal OB | 0.52 | 0.52 | 0.48 | 0.40 |
| Solvent Red 49 | 0.31 | 0.31 | 0.29 | 0.31 |
| Total % | 100.00 | 100.00 | 100.00 | 100.00 |

Paraloid B-99 is a methacrylate base terpolymer available from Dow Chemical Corporation. CAB 551-0.01 is a cellulose ester from Eastman Chemical Corporation. Add Bond LTH is a polyster resin available from Evonik Industries Corporation. DC233 is a polysiloxane resin available from Dow Corning Corporation. Solvent Red 49 is a solvent soluble xanthene dye available from Sunbelt Corporation.

The Examples 4 through 7 each exhibited required properties for proper jetting with a CU printer. A Videojet 1000 Series printer was used to generate print samples of the inks on both bottle caps and aluminum plates as before. The relative lightfastness of the codes were assessed, this time using double the exposure intensity or 0.56 W/(m$^2$-nm) (measured at the 340 nm reference point). The samples were all suitably lightfast, although readability varied slightly by ink. These comparisons are set forth in Table 5. All printed samples also showed good adhesion on metals, plastics and bottle caps as was necessary.

TABLE 5

|  | Example 4 | Example 5 | Example 6 | Example 7 |
| --- | --- | --- | --- | --- |
| Exposure time, hours | 24 | 24 | 24 | 24 |
| % Codes readable (all samples) | 100 | 90 | 90 | 90 |
| Red dye fading noted on caps | No fading | No fading | No fading | Some fading |
| Red dye fading noted on aluminum | No fading | No fading | No fading | No fading |

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An ink jet ink composition comprising: an organic solvent, wherein the organic solvent comprises a ketone, an alcohol, or a mixture thereof, and is present in an amount in a range of 60% to 90% by weight of the ink composition; a solubilizing agent selected from cyclic ketones; heterocyclic amides; cyclic alcohols; furans; and mixtures thereof; and two or more different luminescent dyes, wherein each luminescent dye has a different luminescence emission profile, wherein the luminescent dyes comprise an invisible fluorescent dye that absorbs ultraviolet light and emits visible light, and one or more visible fluorescent dyes that absorb the light emitted by the invisible fluorescent dye, wherein the luminescent dyes are selected from the classes of aromatic, substituted aromatic, heterocyclic, cyanine, xanthene, acridine, phenazine, napthol, porphyrrin, coumarin, pyrromethene, oxazine, oxazole, perylene, and napthalimide dyes, and combinations thereof.

2. A method of printing a security code on an article comprising: applying droplets of an ink composition of claim 1 with an ink jet printer to a surface of an article to print a code.

3. The method of claim 2 wherein the code is an encrypted code.

4. The method of claim 2 wherein the code is a two dimensional bar code.

5. The method of claim 2 further comprising reading the code with a vision system.

6. The method of claim 5 further comprising verifying the authenticity of the code.

7. The method of claim 2 wherein the code is visible to the unaided eye.

8. The method of claim 2 wherein the code is invisible to the unaided eye.

9. The ink jet ink composition of claim 1 wherein the invisible fluorescent compound comprises a benzoxazole.

10. The ink jet ink composition of claim 1 wherein invisible fluorescent dye absorbs ultraviolet light while emitting light in a wavelength range between 400 and 550 nm, and the one or more visible fluorescent dyes absorb light in a wavelength range between 400 and 550 nm and emit light above 550 nm, wherein an emissive peak of the invisible fluorescent dye is separated by atleast 50 nm from an emissive peak of the visible fluorescent dye.

11. The ink jet ink composition of claim 1 further comprising a conductive agent.

12. The ink jet ink composition of claim 1 wherein the ink composition provides a light-stable and water-resistant mark when printed on a substrate.

13. The ink jet ink composition of claim 1 wherein the solubilizing agent is selected from benzyl alcohol and cyclohexanone.

14. The ink jet ink composition of claim 1 wherein the ink composition comprises a binder resin.

* * * * *